United States Patent [19]
Jarchow

[11] Patent Number: 5,496,223
[45] Date of Patent: Mar. 5, 1996

[54] LOAD SHIFT TRANSMISSION WITH STEPLESS HYDROSTATIC GEARING

[76] Inventor: Friedrich Jarchow, Am Ruhrstein 37, 45133 Essen, Germany

[21] Appl. No.: 251,695

[22] Filed: May 31, 1994

[30] Foreign Application Priority Data

May 28, 1993 [DE] Germany ............................ 43 17 763.8
Jul. 13, 1993 [DE] Germany ............................ 43 23 358.9

[51] Int. Cl.$^6$ ............................ F16H 47/04; B60K 17/06
[52] U.S. Cl. .................. 475/72; 475/80; 475/82
[58] Field of Search ................... 475/72, 74, 80, 475/81, 82, 338, 339

[56] References Cited

U.S. PATENT DOCUMENTS

| | | | |
|---|---|---|---|
| 3,364,790 | 1/1968 | Jean-Jacques Asper et al. | 475/80 X |
| 3,969,958 | 7/1976 | Miyao et al. | 475/81 X |
| 5,052,987 | 10/1991 | Hagin et al. | 475/74 X |
| 5,403,241 | 4/1995 | Jarchow | 475/80 X |

FOREIGN PATENT DOCUMENTS 2261039  5/1993  United Kingdom .................... 475/72

*Primary Examiner*—Khoi Q. Ta
*Attorney, Agent, or Firm*—Kinney & Lange

[57] ABSTRACT

A load shift transmission with stepless hydrostatic gearing comprising: a hydrostatic transmission having a displacement machine with an adjustable volume and a displacement machine with a constant volume; a five-shaft planetary gear transmission having: a coupling shaft for the constant volume displacement machine, the coupling shaft formed by a first planet gear section which meshes with a first sun gear and a first ring gear; a start up coupling shaft formed by a second planet gear section which meshes with a second sun gear; a slow running coupling shaft formed by a third planet gear section which meshes with a third sun gear; a fast running coupling shaft formed by the ring gear of the first planet gear section; an input shaft formed by a planet gear carrier on which the first, second and third planet gear sections are mounted; and an output shaft, wherein the coupling shafts alternately transfer the requisite power through subsequent gear shifting steps to the output shaft.

20 Claims, 6 Drawing Sheets

4.    2.        3.  5.  1.

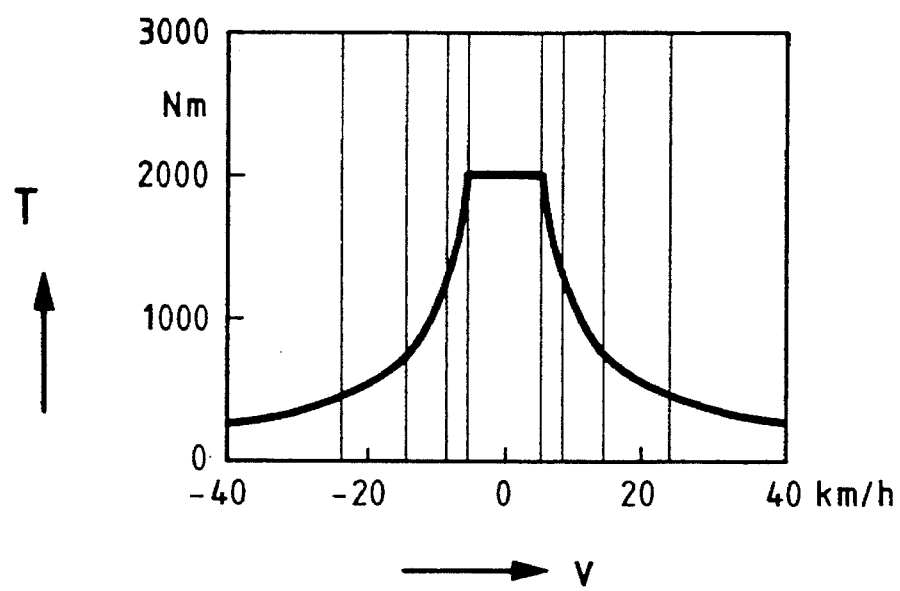
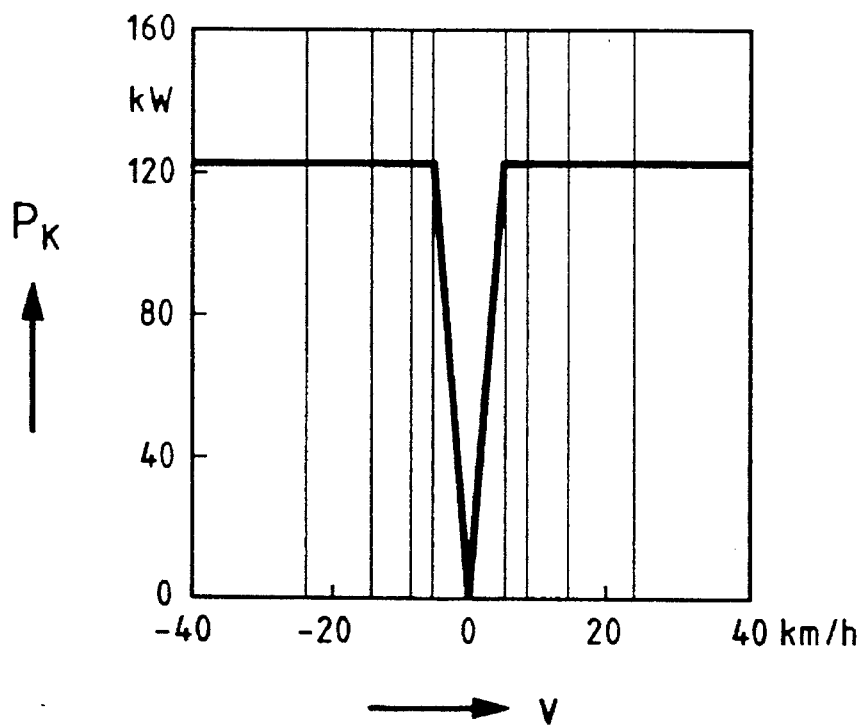

LOAD SHIFT TRANSMISSION WITH STEPLESS HYDROSTATIC GEARING

BACKGROUND OF THE INVENTION

The present application relates to load shift transmissions with stepless hydrostatic gearing, i.e. steplessly working hydrostatic-mechanical load shift transmissions, which are advantageously suitable for motor vehicles since they are steplessly adjustable over a wide range, and in addition have good efficiency. The relatively large adjustment range permits the operation of combustion-power engines on advantageous performance lines. Such lines can be, for example, the curve for minimal fuel consumption or a line for a good acceleration characteristic.

FIG. 8 of EP 0 302 188 A1 shows a hydrostatic-mechanical load shift transmission with a five-shaft planetary gear transmission, which consists of three planetary steps respectively with the members sun gear 1', planet gear carrier s', and ring gear 2', next, sun gear 1'', planet gear carrier s'', and ring gear 2'' as well as sun gear 1''', planet gear carrier s''', and ring gear 2'''. The coupled element members 2', 2'' and s''' function as drive shaft 1, s' and s'' as the slow-running coupling shaft, the ring gear 2''' as the fast-running coupling shaft, the sun gear 1' as the connection shaft for the constant-volume displacement machine b, and the joined-together sun gears 1'' and 1''' as the coupling shaft for the hydrostatic-mechanical startup.

WO 89/09899 (PTC/EP 89/00348) describes a hydrostatic-mechanical load shift transmission with a five-shaft planetary gear transmission, to which likewise belong three coupled planetary steps, namely the step with sun gear 17, planet gear carrier 12, and ring gear 20, next, the step with sun gear 16, planet gear carrier 19, and ring gear 14, and finally the step with sun gear 22, planet gear carrier 24, and ring gear 25. To the drive shaft pertain the joined element, planet gear carrier 12 and ring gear 14, to the slow-running coupling shaft the coupled elements, ring gear 20 and planet gear carrier 24, to the fast-running coupling shaft the joined sun gears 17 and 22, to the connection of the constant-volume displacement machine 7 the sun gear 16, and finally to the coupling shaft for the hydrostatic-mechanical startup the ring gear 25.

The above-described five-shaft planetary gear transmissions of the hydrostatic-mechanical load shift transmissions are built relatively in a long length and expensively.

The invention thus poses as its problem, to suggest a five-shaft planetary gear transmissions for load shift transmissions with stepless hydrostatic-mechanical gearing, consisting of three joined planetary steps, and having a simplified construction.

SUMMARY OF THE INVENTION

The transmission according to the present invention consists of a five-shaft planetary gear transmission, of a steplessly adjustable hydrostatic transmission arranged parallel to it, of gear shifting steps, and of clutch couplings. To the hydrostatic transmission belong a displacement machine with an adjustable displacement volume and a displacement machine with constant displacement volume. One shaft of the planetary gear transmission forms the drive shafts, to which the adjustable displacement machine is linked. The constant-volume displacement machine is joined to a second shaft of a planetary gear transmission. The remaining three shafts represent coupling shafts, which alternately conduct the power to the output shaft via the gear shifting steps. There is a coupling shaft for the hydrostatic-mechanical startup, a fast-running and a slow-running coupling shaft. In the extreme position of the volume-adjustable displacement machine, clutch couplings provide the change of the gear shifting steps without interruption of the tractive force, at synchronous revolution velocities. The five-shaft planetary gear transmission can be build relatively in a short length and can be manufactured at a comparatively modest expense.

BRIEF DESCRIPTION OF THE DRAWINGS

FIG. 4 is a diagram illustrating the output torque of the five-shaft gear transmission;

FIG. 5 is a diagram illustrating the power load on the crank shaft $P_k$ of the five-shaft planetary gear transmission;

DETAILED DESCRIPTION OF THE PREFERRED EMBODIMENTS

Figure 1:
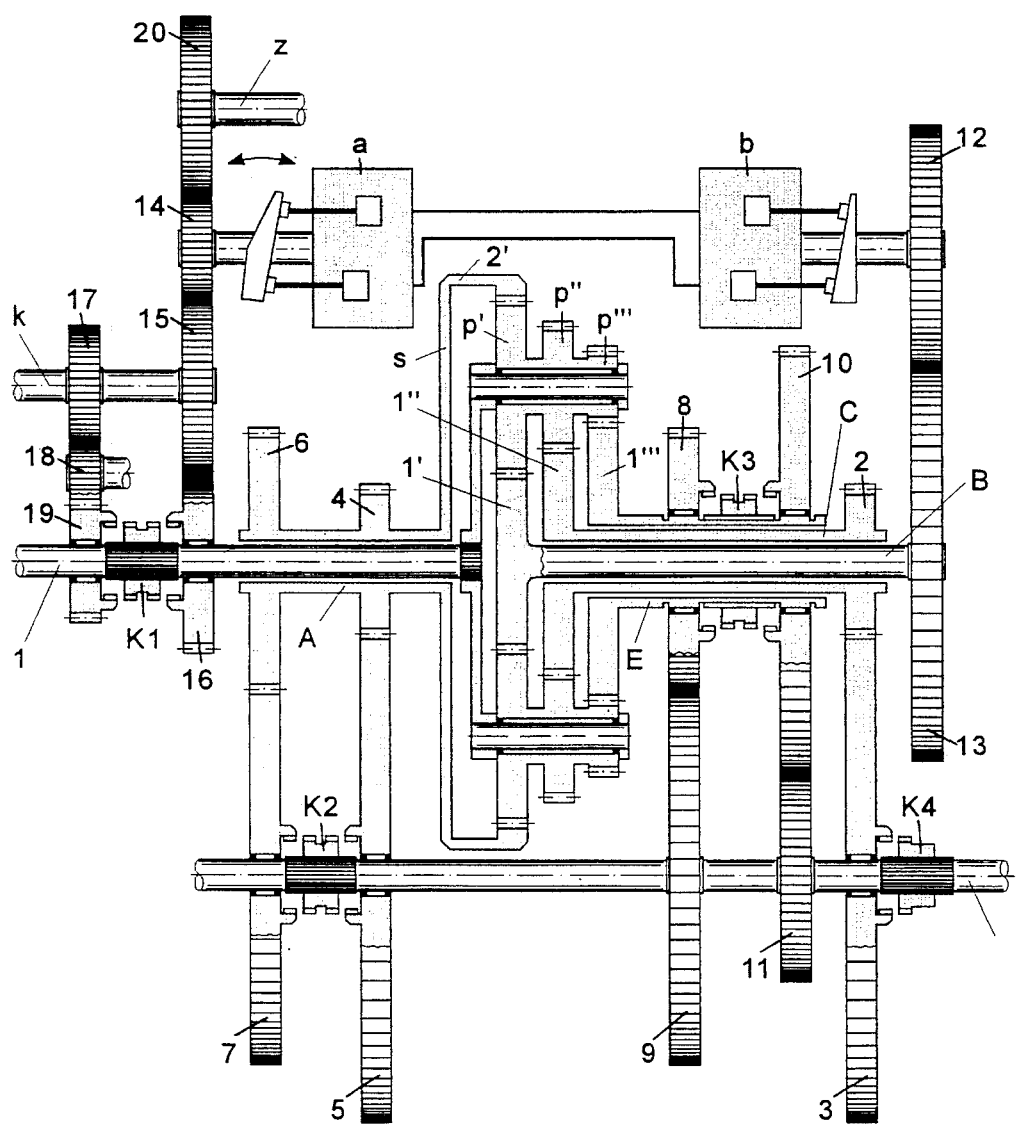
FIG. 1 is a schematic drawing of a five-shaft planetary gear transmission according to the present invention.

With the design example for a fully reversible tractor according to FIG. 1, the five-shaft planetary gear transmission consists of three joined planetary steps, I, II, III, with a common planet gear carrier. Belonging to planetary step I are the sun gear 1'', the planet gear part p'' and the ring gear 2', to planetary step II the sun gear 1', the planet gear parts p' and p'', and the sun gear 1'', and finally to planetary gear step III the sun gear 1', the planet gears p' and p''', and the sun gear 1'''.

The input shaft 1 is joined to planet carrier s. The sun gear 1'' functions as the coupling shaft C for the startup with the gears 2 and 3 for first gear shifting step. The ring gear 2' constitutes the fast-running coupling shaft A for second gear shifting step with the gears 4 and 5, as well as for fourth gear shifting step with the gears 6 and 7. The sun gear 1''' forms the slow-running coupling shaft E for third gear shifting step with the gears 8 and 9, as well as for fifth gear shifting step with the gears 10 and 11. The individual gear shifting step work on the output shaft ab. The constant-volume displacement machine b is connected to the sun gear 1' via the gears 12 and 13. The gears 14 and 15 connect the adjustable-volume displacement machine a of the hydrostatic transmission to the crankshaft k of the combustion-power engine. The gears 15 and 16, as well as 17, 18, and 19 form the drive-side reverse gearing. The shiftings are provided by the double clutch K1 for the reverse gearing, by K2 for second and fourth gear shifting steps, by K3 for third and fifth gear shifting steps, as well as by the clutch K4 for first gear shifting step. The power take off shaft Z is connected via the gears 20, 14, and 15 with the crankshaft k.

With an arrangement of three stepped planet gears equally located at the periphery of the planet carrier, teeth-counts for example of t1'=45, t1''=60, t1'''=75, tp'=45, tp''=30, tp'''=15 and t2'=−135 fulfill the installation conditions. These teeth-counts make possible also the necessary constant shaft distance.

The chosen teeth-counts determine the stationary gear ratios $i_o$, that is, the gear ratios with a stationary planet gear carrier, that is, the planet carrier of the individual planetary steps. So for step I, $i_{oI}=t2'/t1'=-3$, for step II $i_{oII}=tp't1''/t1'tp''=2$, and for step III $i_{oIII}=tp't1'''/t1'tp'''=5$.

Figure 2:
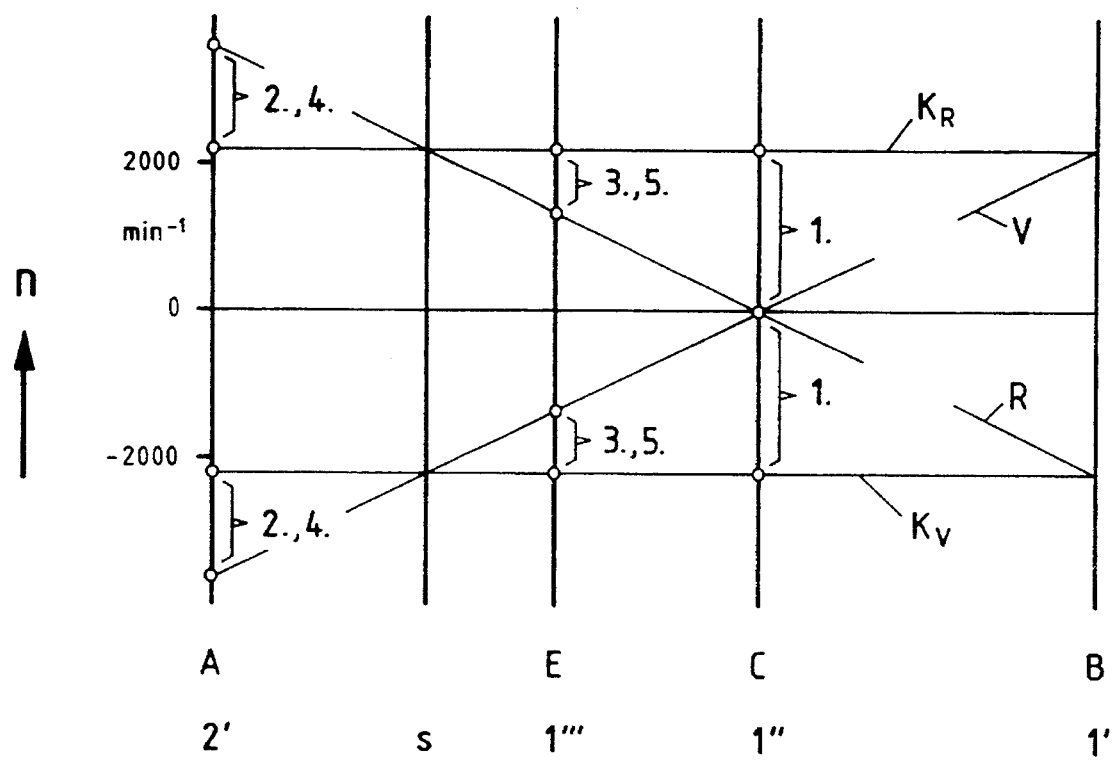
FIG. 2 is a diagram illustrating a rotational velocity ladder of the five-shaft planetary gear transmission.

FIG. 2 shows for the chosen example the rotational velocity ladder diagram of the five-shaft planetary gear transmission. The stationary gear ratios determine the position and spacing of the rotation velocity ladders for the elements 2', s, 1''', 1'', 1' or respectively for the shafts A, s, E, C, and B. Since the rotational velocities n of the individual shafts are related linearly, any straight line in the rotational velocity ladder diagram gives the accompanying rotational velocity condition. In FIG. 2, the line V marks the startup condition with forward movement and the line R the startup condition with backward movement. The horizontal lines Kv and Kr mark the coupling condition of the planetary steps I, II, and III. FIG. 2 shows the rotational velocity ranges of the respective power-transferring gear shifting steps.

A more detailed explanation of the rotational velocity ladder diagram may be found in Muller, Herbert W. "Die Umlaufgetriebe", Springer Verlag, 1971.

For the position ratio of the coupling shaft A, the equation $\Phi A=(i_{oI}-2)/i_{oI}$ holds good and for that of the coupling shaft E the equation $\Phi E=i_{oIII}/(i_{oIII}-2)$. For equal position ratios, thus $\Phi A=\Phi E$, the condition $i_{oI}+i_{oIII}=2$ must be fulfilled.

Figure 3:
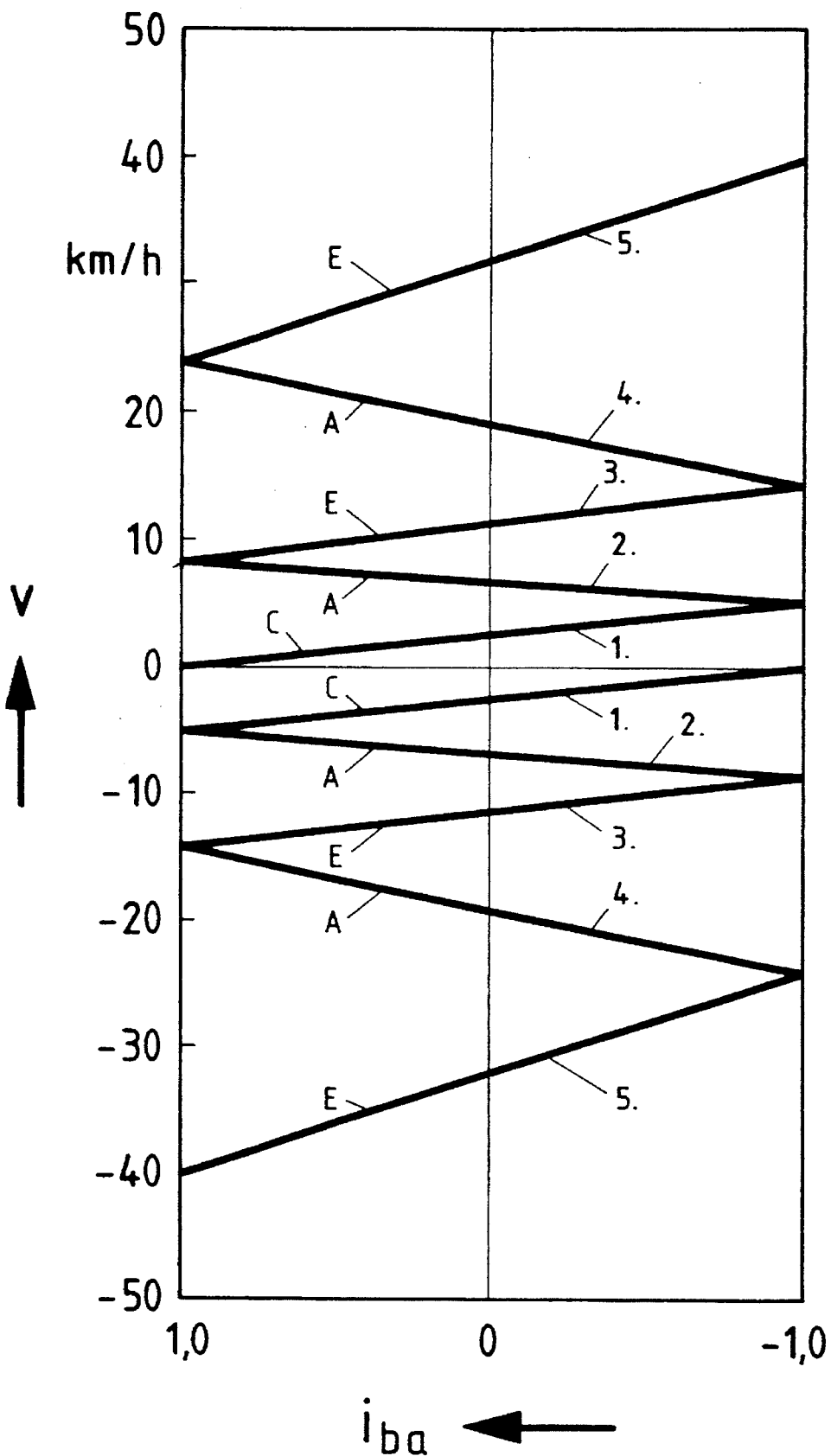
FIG. 3 is a diagram illustrating the dependance of the speed of the tractor in relation to the hydrostatic transmission.

FIG. 3 shows the dependance of the speed v of the tractor upon the gear ratio of the hydrostatic transmission $i_{ba}=n_b/n_a$. The diagram indicates the power-transferring coupling shafts as well as the corresponding gear shifting step at each time.

Figure 6:
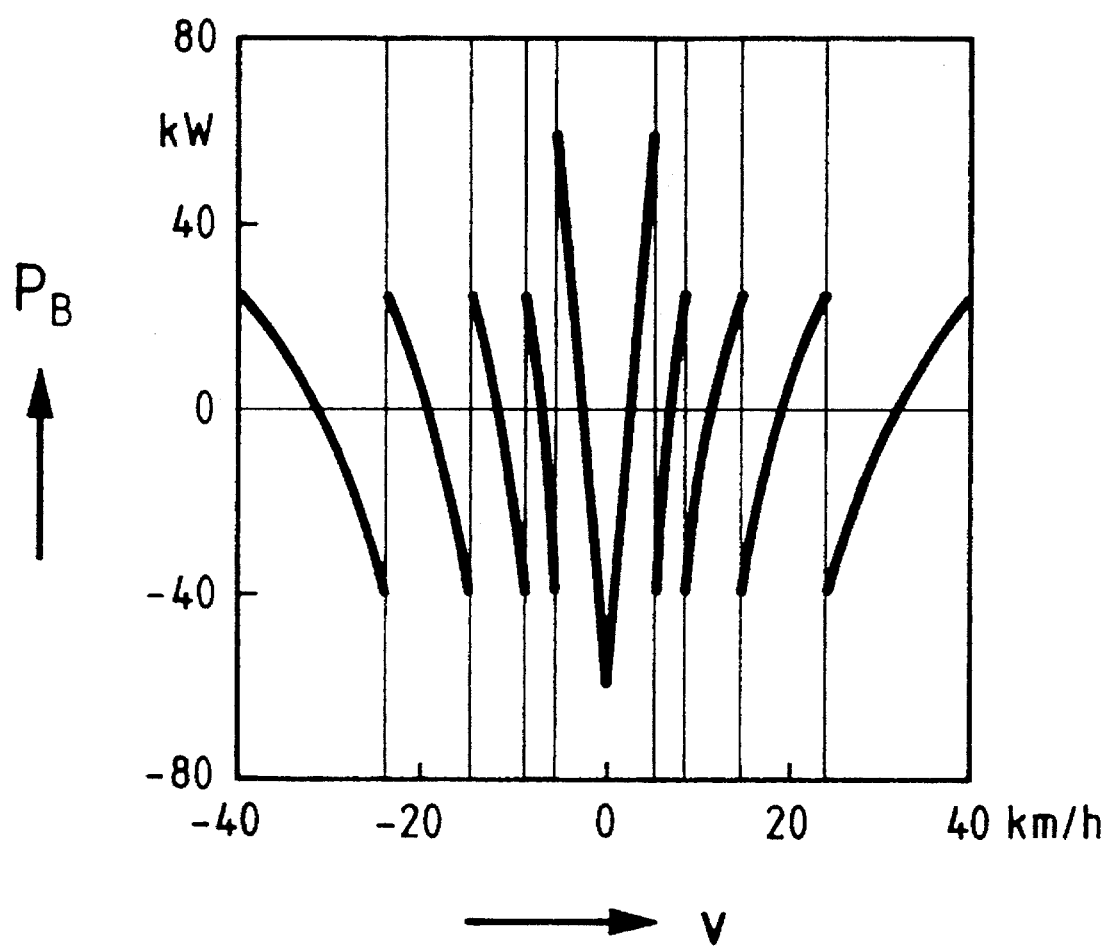
FIG. 6 is a diagram illustrating the hydrostatic power $P_b$ of the five-shaft planetary gear transmission.
Figure 7:
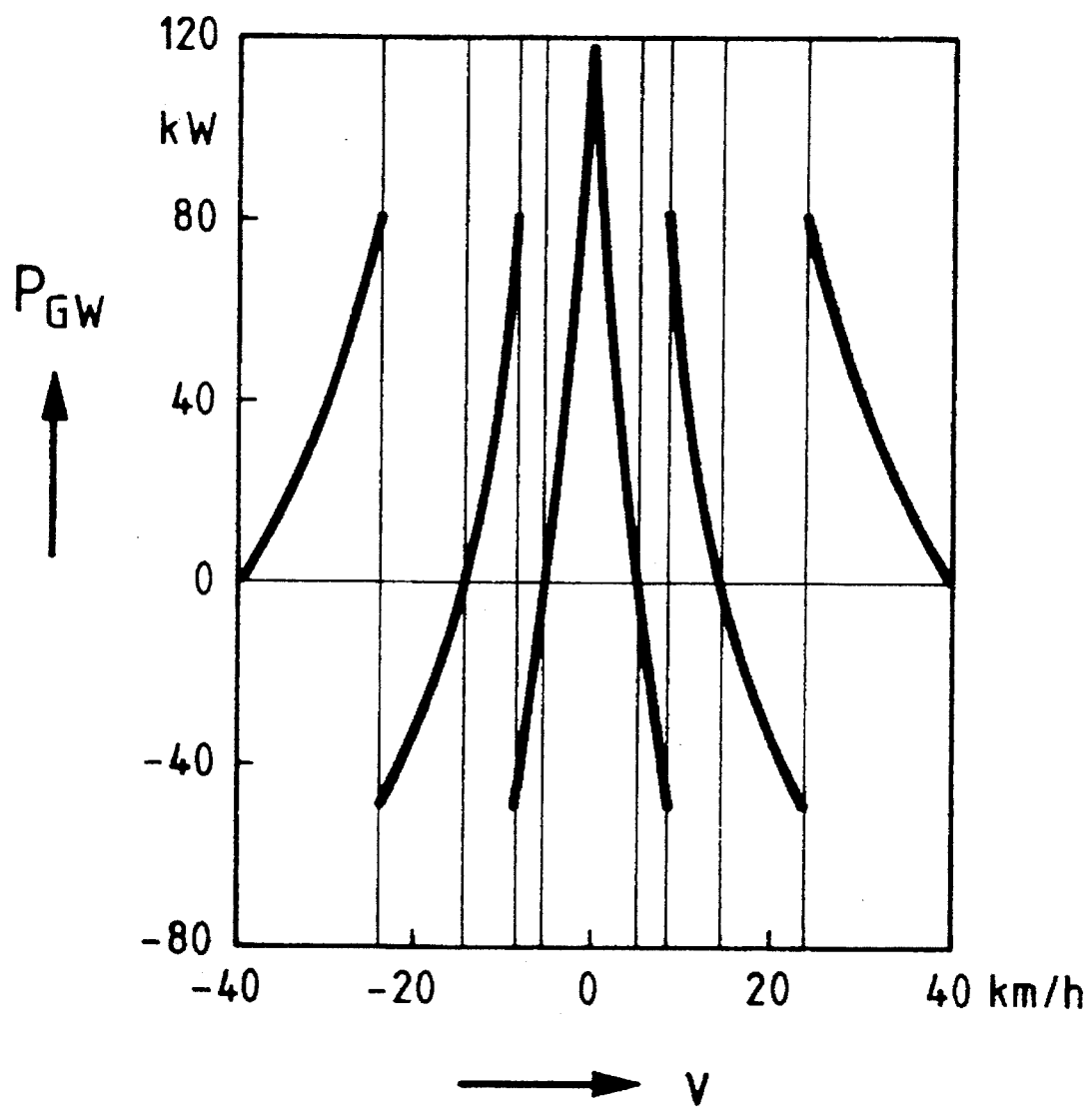
FIG. 7 is a diagram illustrating the slide wheel power $P_{gw}$ of the five-shaft planetary gear transmission.

For further explanation, FIG. 4 shows the output torque $T_{ab}$, dependent in each case upon the travelling speed v, FIG. 5 the corresponding power load on the crankshaft $P_k$, FIG. 6 the corresponding hydrostatic power $P_B$, and FIG. 7 the corresponding slide/roll power $P_{GW}$ of the five-shaft planetary transmission. These representations neglect the power losses. The tractor reaches the slip limit at an output torque $T_{ab}=2000$ Nm. The FIGS. 4 through 7 indicate the power-transmitting gear shifting step at each time.

Investigations into construction have shown that the production expense of the transmission according to the invention, in relation to the transmissions according to the patent documents mentioned at the beginning, is lower. Beyond that, the length of the five shaft planetary gear is shorter. If one sets the length of the five shaft planetary gear according to the invention at 100% for the 122.5 kW tractor used as an example, the length for the approximately equal build cross-section with the recommendations according to FIG. 8 of EP 0 302 188 A1 comes to 180% and according to the document WO 89109899 to 240%

Although the present invention has been described with reference to preferred embodiments, workers skilled in the art will recognize that changes may be made in form and detail without departing from the spirit and scope of the invention.

What is claimed is:

1. A load shift transmission with stepless hydrostatic gearing comprising:

a five-shaft planetary gear transmission of which a first shaft (1) forms the input shaft, a second shaft (B) transmits rotary power and is operatively connected to the input shaft and through a first hydrostatic displacement machine, which along with a second displacement machine form a steplessly adjustable hydrostatic transmission, a third shaft (E) of the five-shaft planetary gear transmission functions as a slow-running coupling shaft, a fourth shaft (A) functions as a fast-running coupling shaft, and a fifth shaft (C) functions as a startup coupling shaft;

a stepped planetary gear arrangement mounted on a planet gear carrier and including a first planet gear section which meshes with a first sun gear and with a ring gear, a second planet gear stepped section which meshes with a second sun gear, and a third planet gear stepped section which meshes with a third sun gear, wherein the planet gear carrier is connected to the input shaft, wherein an extension of the first planet gear section forms the second shaft, wherein an extension of the second planet gear section forms the startup coupling shaft, wherein an extension of the ring gear forms the fast-running coupling shaft, and wherein an extension of the third planet gear section forms the slow-running coupling shaft; and a first plurality of drive gears mounted on the fast running coupling shaft, a second plurality of drive gears operatively connectable to the slow running coupling shaft, and a third plurality of drive gears operatively connectable to the startup coupling shaft, the first, second and third plurality of drive gears being operatively connectable to an output shaft for alternately transferring the rotary power through gear shifting means for connecting a respective one of the plurality of drive gears to the output shaft of the load shift transmission, whereby at a predetermined position of the hydrostatic machine the changing of individual gear shifting means occurs without interruption of tractive power and at synchronous revolution velocities.

2. The load shift transmission of claim 1, further comprising a first gear mounted on the output shaft, the first gear connected to a second gear mounted on the start up coupling shaft for providing a first gear shifting step.

3. The load shift transmission of claim 2, further comprising a third gear mounted on the output shaft, the third gear connected to a fourth gear mounted on the fast running coupling shaft for providing a second gear shifting step.

4. The load shift transmission of claim 3, further comprising a fifth gear mounted on the output shaft, the fifth gear connected to a sixth gear mounted on the slow running coupling shaft for providing a third gear shifting step.

5. The load shift transmission of claim 4, further comprising a seventh gear mounted on the output shaft, the seventh gear connected to an eighth gear mounted on the fast running coupling shaft for providing a fourth gear shifting step.

6. The load shift transmission of claim 5, further comprising a ninth gear mounted on the output shaft, the ninth gear connected to a tenth gear mounted on the slow running coupling shaft for providing a fifth gear shifting step.

7. The load shift transmission of claim 6, further comprising a first double clutch mounted on the output shaft for shifting between the second and the fourth gear shifting steps.

8. The load shift transmission of claim 7, further comprising a second double clutch mounted in the slow running coupling shaft for shifting between the third and the fifth gear shifting steps.

9. The load shift transmission of claim 1, further comprising a pair of gears connecting the adjustable volume displacement machine to a crankshaft (k) of an engine.

10. The load shift transmission of claim 9, further comprising a plurality of gears for providing drive side reverse gearing, the plurality of gears connecting the input shaft.

11. A load shift transmission with stepless hydrostatic gearing comprising:

a hydrostatic transmission having a displacement machine with an adjustable volume and a displacement machine with a constant volume;

a five-shaft planetary gear transmission having:
 a coupling shaft for operative connection to the constant volume displacement machine, the coupling shaft formed by extension of a first sun gear section which meshes with a first planet gear of integral planet gear sections and a first ring gear;
 a start up coupling shaft formed by extension of a second sun gear section which meshes with a second planet gear of integral planet gear sections;
 a slow running coupling shaft formed by extension of a third sun gear section which meshes with a third planet gear of integral planet gear sections;
 a fast running coupling shaft formed by the ring gear of the first sun gear section;
 an input shaft operatively connected to the hydrostatic transmission, the input shaft being formed by a planet gear carrier on which the first, second and third planet gear of said integral planet gear sections are mounted; and an output shaft operatively connected to the start up coupling shaft by a first selectable coupling means, to the slow running coupling shaft by a second selectable coupling means, and to the fast running coupling shaft by a third selectable coupling means.

12. The load shift transmission of claim 11, further comprising a first gear mounted on the output shaft, the first gear connected to a second gear mounted on the start up coupling shaft for providing a first gear shifting step.

13. The load shift transmission of claim 12, further comprising a third gear mounted on the output shaft, the third gear connected to a fourth gear mounted on the fast running coupling shaft for providing a second gear shifting step.

14. The load shift transmission of claim 13, further comprising a fifth gear mounted on the output shaft, the fifth gear connected to a sixth gear mounted on the slow running coupling shaft for providing a third gear shifting step.

15. The load shift transmission of claim 14, further comprising a seventh gear mounted on the output shaft, the seventh gear connected to an eighth gear mounted on the fast running coupling shaft for providing a fourth gear shifting step.

16. The load shift transmission of claim 15, further comprising a ninth gear mounted on the output shaft, the ninth gear connected to a tenth gear mounted on the slow running coupling shaft for providing a fifth gear shifting step.

17. The load shift transmission of claim 16, wherein the third selectable coupling means is a double clutch for shifting between the second and the fourth gear shifting steps.

18. The load shift transmission of claim 17, wherein the first selectable coupling means is a double clutch for shifting between the third and the fifth gear shifting steps.

19. The load shift transmission of claim 11, further comprising a pair of gears connecting the adjustable volume displacement machine to a crankshaft of an engine.

20. The load shift transmission of claim 19, further comprising a plurality of gears for providing drive side reverse gearing, the plurality of gears connecting the input shaft.

* * * * *